US008661356B2

(12) United States Patent
Demant et al.

(10) Patent No.: US 8,661,356 B2
(45) Date of Patent: Feb. 25, 2014

(54) TIME APPLICATION HAVING AN INTERGRATED CHECK ENGINE

(75) Inventors: Hilmar Demant, Karlsdorf (DE);
Mahesh Gopalan, Bangalore (IN);
Vinod S. Nair, Palakkad (IN);
Jayakanth R, TamilNadu (IN); Aaby Sivakumar, Kollam (IN); Abdul Aziz, Bangalore (IN); Debobrata Bose, Kolkata (IN); Indranil Dutt, Bangalore (IN); Niels Hebling, Schriesheim (DE); Carsten Brandt, Mannheim (DE)

(73) Assignee: SAP AG, Walldorf (DE)

( * ) Notice: Subject to any disclaimer, the term of this patent is extended or adjusted under 35 U.S.C. 154(b) by 625 days.

(21) Appl. No.: 12/871,369

(22) Filed: Aug. 30, 2010

(65) Prior Publication Data

US 2012/0054659 A1  Mar. 1, 2012

(51) Int. Cl.
  *G06F 3/00*  (2006.01)
(52) U.S. Cl.
  USPC .......................................... 715/762; 715/763
(58) Field of Classification Search
  USPC ................................................ 715/762–763
  See application file for complete search history.

(56) References Cited

U.S. PATENT DOCUMENTS

| 7,146,535 | B2 * | 12/2006 | Little et al. ...................... 714/26 |
| 7,343,554 | B2 * | 3/2008 | Waldorf et al. ............... 715/236 |
| 7,603,653 | B2 * | 10/2009 | Sundararajan et al. ....... 717/105 |
| 7,761,842 | B2 * | 7/2010 | Udler ............................ 717/106 |
| 7,809,763 | B2 * | 10/2010 | Nori et al. ...................... 707/802 |
| 7,870,512 | B2 * | 1/2011 | Misovski ....................... 715/861 |
| 2003/0093720 | A1 * | 5/2003 | Miyao et al. ..................... 714/38 |
| 2003/0221184 | A1 * | 11/2003 | Gunjal et al. .................. 717/118 |
| 2004/0139186 | A1 * | 7/2004 | Lee et al. ....................... 709/223 |
| 2005/0060650 | A1 * | 3/2005 | Ryan et al. ..................... 715/526 |
| 2006/0031750 | A1 * | 2/2006 | Waldorf et al. ............. 715/501.1 |
| 2006/0190486 | A1 * | 8/2006 | Zhou et al. ................. 707/104.1 |
| 2007/0016650 | A1 * | 1/2007 | Gilbert et al. ................. 709/207 |
| 2007/0150805 | A1 * | 6/2007 | Misovski ....................... 715/518 |
| 2008/0004929 | A9 * | 1/2008 | Raffel et al. ...................... 705/8 |
| 2008/0222150 | A1 * | 9/2008 | Stonecipher ..................... 707/8 |
| 2008/0320404 | A1 * | 12/2008 | Chen et al. ..................... 715/763 |
| 2011/0173551 | A1 * | 7/2011 | Ikegami ........................ 715/764 |
| 2012/0246122 | A1 * | 9/2012 | Short et al. .................... 707/690 |

* cited by examiner

*Primary Examiner* — Ryan Pitaro
(74) *Attorney, Agent, or Firm* — Brake Hughes Bellermann LLP

(57) ABSTRACT

A method, including executing instructions recorded on a non-transitory computer-readable storage media using at least one processor, may include loading a component from a repository in a first user interface, notifying a second user interface that the component is loaded in the first user interface, performing one or more checks on the component using a check engine and generating one or more check results, storing the check results in a buffer and displaying the check results in the second user interface. The first user interface, the second user interface, the buffer and the check engine may be integrated modules of a single application.

20 Claims, 7 Drawing Sheets

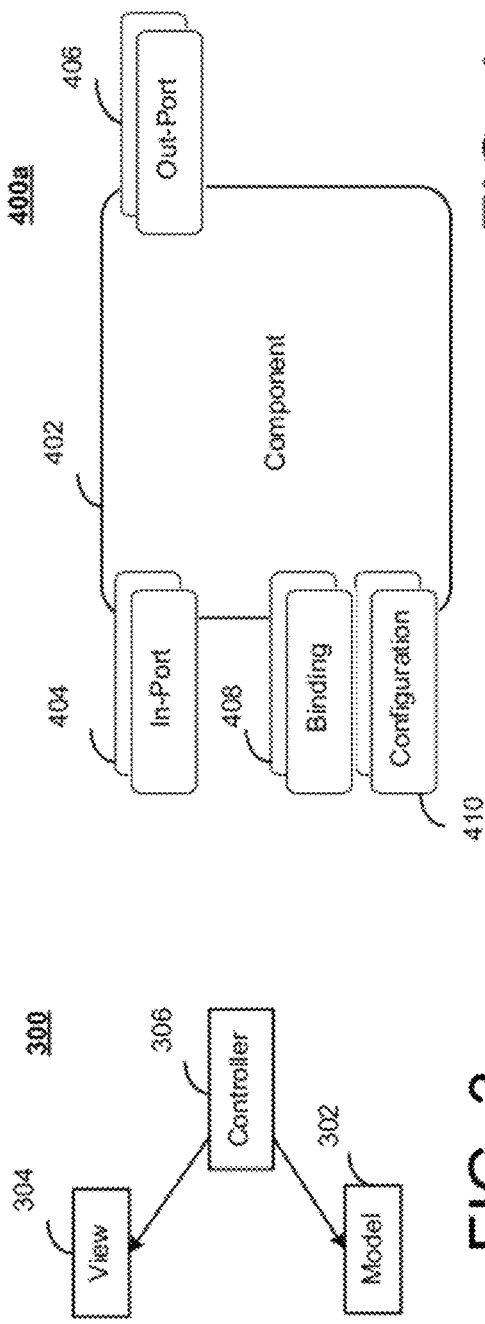
FIG. 4a
FIG. 3
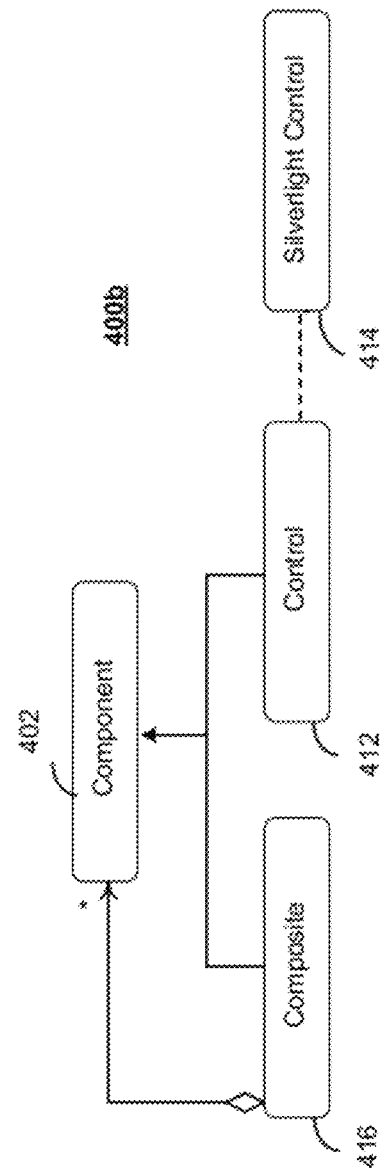
FIG. 4b

TIME APPLICATION HAVING AN INTERGRATED CHECK ENGINE

TECHNICAL FIELD

This description relates to a design time application having an integrated check engine.

BACKGROUND

Many businesses and organizations may utilize services (e.g., software applications) that may be provided by one or more providers that may offer user interfaces (UIs) for accessing applications that may be customized for a particular user. For example, a user may desire access via a frontend client device to customer invoice applications that are customized to that particular user. As other examples, the user may also desire access to applications for managing customer relationships, financial management, management of projects, management of supply chain networks, management of supplier relationships, support for executive management, and management of compliance with laws and regulations. Customization may be furnished by the provider, or the user may have a capability to customize particular aspects of an application or service. Further, the provider may host the software and associated data on one or more provider backend devices including host servers. The users may then access the services via remote connections (e.g., via the Internet) using various client frontend devices (e.g., a server local to the user with connecting devices, desktop computers, laptop computers, handheld devices, etc.). The users may then be able to access powerful functionality (e.g., business processes) without requiring a significant up-front investment by the user in extensive Information Technology (IT) personnel and equipment, for example, as part of the user's business setup.

Developers and other users may use tools such as, for example, a design time application to create and design the UIs, including the UI components, for eventual use by the frontend client device during a runtime scenario. In a design time application, it may be desirable to be able to run checks on the UI components and to take certain actions following the checks.

SUMMARY

According to one general aspect, a method may include executing instructions recorded on a non-transitory computer-readable storage media using at least one processor. The method may include loading a component from a repository in a first user interface, notifying a second user interface that the component is loaded in the first user interface, performing one or more checks on the component using a check engine and generating one or more check results, storing the check results in a buffer and displaying the check results in the second user interface, where the first user interface, the second user interface, the buffer and the check engine are integrated modules of a single application.

Implementations may include one or more of the following features. For example, performing one or more checks on the component may include performing the one or more checks on the component based on a context of the component in the first user interface. The method may further include merging a current state of the component loaded in the first user interface with the check results stored in the buffer to form a merged component and loading the merged component in the first user interface. The method may further include storing the merged component in the repository. The method may further include storing the merged component and the check results in the repository. The method may further include enabling a user to edit the component in the first user interface, performing one or more checks on the component using the check engine and generating one or more check results, storing the check results in the buffer, merging the component with the check results and loading the merged component in the first user interface. The method may further include enabling a user to annotate the check results and storing the merged component and the annotated check results in the repository.

In another general aspect, a non-transitory recordable storage medium having recorded and stored thereon instructions that, when executed, may perform the actions of loading a component from a repository in a first user interface, notifying a second user interface that the component is loaded in the first user interface, performing one or more checks on the component using a check engine and generating one or more check results, storing the check results in a buffer and displaying the check results in the second user interface, where the first user interface, the second user interface, the buffer and the check engine are integrated modules of a single application.

Implementations may include one or more of the following features. For example, the instructions that, when executed, perform the action of performing one or more checks on the component may include instructions that, when executed, perform the action of performing the one or more checks on the component based on a context of the component in the first user interface. The non-transitory recordable storage medium may further include instructions that, when executed, perform the actions of merging a current state of the component loaded in the first user interface with the check results stored in the buffer to form a merged component and loading the merged component in the first user interface. The non-transitory recordable storage medium may further include instructions that, when executed, perform the action of storing the merged component in the repository. The non-transitory recordable storage medium may further include instructions that, when executed, perform the action of storing the merged component and the check results in the repository. The non-transitory recordable storage medium may further include instructions that, when executed, perform the actions of enabling a user to edit the component in the first user interface, performing one or more checks on the component using the check engine and generating one or more check results, storing the check results in the buffer, merging the component with the check results and loading the merged component in the first user interface. The non-transitory recordable storage medium may further include instructions that, when executed, perform the actions of enabling a user to annotate the check results and storing the merged component and the annotated check results in the repository.

In another general aspect, a computer system including instructions stored on a non-transitory computer-readable storage medium, may include a repository that is arranged and configured to store a plurality of components, a designer module that is arranged and configured to load a component from the repository in a first user interface and notify a second user interface that the component is loaded in the first user interface. The computer system may include a check engine that is arranged and configured to perform one or more checks on the component, generate one or more check results, store the check results in a buffer and cause the check results to be displayed in the second user interface, where the check engine, the first user interface, and the second user interface are integrated modules of the designer module.

Implementations may include one or more of the following features. For example, the check engine may be arranged and configured to perform the one or more checks on the component based on a context of the component in the first user interface. The check engine may be further arranged and configured to merge a current state of the component loaded in the first user interface with the check results stored in the buffer to form a merged component and load the merged component in the first user interface. The designer module may be further arranged and configured to store the merged component and the check results in the repository. The designer module may be arranged and configured to enable a user to edit the component in the first user interface and the check engine may be further arranged and configured to perform one or more checks on the component, generate one or more check results, store the check results in the buffer, merge the component with the check results and load the merged component in the first user interface. The check engine may be further arranged and configured to enable a user to annotate the check results and the designer module may be arranged and configured to store the merged component and the annotated check results in the repository.

The details of one or more implementations are set forth in the accompanying drawings and the description below. Other features will be apparent from the description and drawings, and from the claims.

BRIEF DESCRIPTION OF THE DRAWINGS

FIG. 3 is a block diagram of an example model-view-controller structure.

FIGS. 4a-4b are block diagrams illustrating an example component structure.

DETAILED DESCRIPTION

This document describes systems and techniques for enabling a developer and other users of UIs to load a UI component from a repository into a designer user interface of a design time application and to perform multiple checks on the UI component using a check engine that is integrated as part of the design time application. The check results generated by the check engine may be stored in a temporary buffer and the check results may be displayed in a check engine user interface, which also may be an integrated part of the design time application. The check engine user interface provides an interface for the developer to take one or more actions related to the check results.

The developer may modify the UI component in the designer UI and the check engine may perform more checks on the modified UI component. The check results from subsequent checks may be saved in the temporary buffer. The modified UI component may be saved in the design time application by merging the original UI component with the check results. In this manner, the save process does not need to be invoked each time modifications are made to the UI component. The developer can modify the UI component multiple times and the check engine can perform checks on the UI component multiple times without saving the component to the designer UI. A single save can be performed using the original UI component and the check results that have been saved in the temporary buffer. After the UI component has been saved, the UI component may be stored in its modified form in the metadata repository. In one exemplary implementation, the check results, including annotated check results, may be saved with the modified UI component in the metadata repository.

Figure 1:
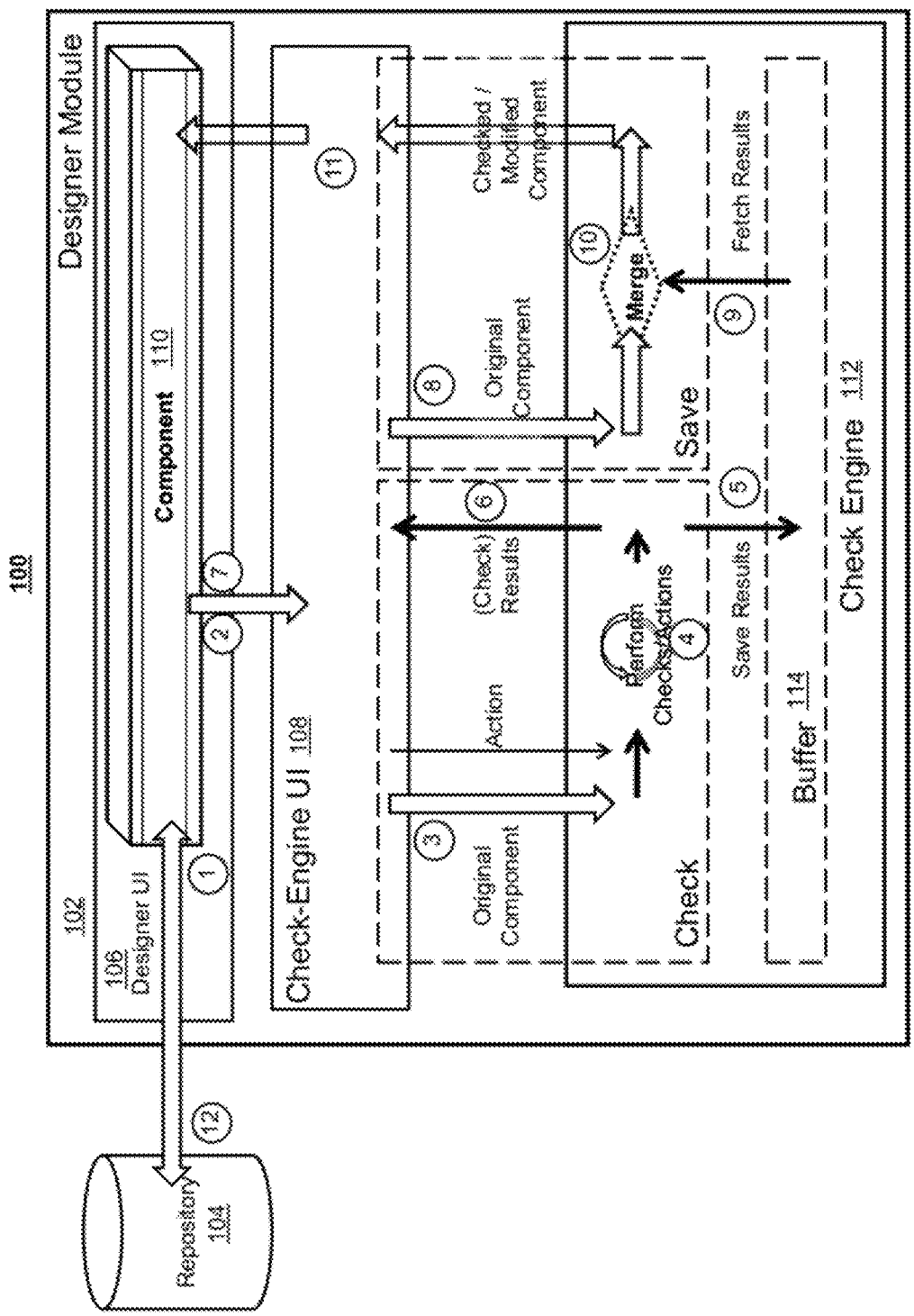
FIG. 1 is an exemplary block diagram of a design time system.

FIG. 1 is an exemplary block diagram of a design time system 100. The design time system 100 may include a designer module 102 and a repository 104. The designer module 102 may be a design time application, which may be an application that is used to develop and maintain an end-to-end user interface (UI). The design time application may be an integrated tool that allows the creation and maintenance of a UI, including all of the UI components, end-to-end starting from early mockups and through an entire development process. The UIs may be modeled and controller logic for the UIs may be implemented in the design time application.

In one exemplary implementation, the design time application may be accessed and used as a stand-alone application, through a browser or as a plug-in to other application programs, including as a plug-in to a browser. For example, the design time application may be used with an application programs such as an Internet web-browser such as the FIREFOX web browser, the APPLE SAFARI web browser, the MICROSOFT INTERNET EXPLORER web browser, or the GOOGLE CHROME web browser.

The designer module 102 may include multiple different user interfaces to support the creation, development and modification of UI components. For example, the designer module 102 may include a designer UI 106 and a check engine UI 108. The designer UI 106 may include multiple different windows. The windows may include a configuration explorer window, a floorplan window, and a properties window. The design time application also may include other windows and views, which are not shown. For instance, the designer UI 106 may include other views having other functionalities such as a designer view, a datamodel view, a controller view and a preview view.

The design time application may be configured as a single design tool to enable different users having different roles to access and create UI components, as may be appropriate to their role. Each role may include one or more different views in the design time application and may include different data rights and access rights. The design time applications is configured to support specific views tailored for specific roles and to provide collaboration tools and a collaboration environment to support the overall development process for UI components. The design time application may be configured to enable visual editing, including drag and drop features and in-place text editing.

In one exemplary implementation, the design time application may be implemented using a .NET framework-based platform. In other exemplary implementations, the design time application may be implemented using a different framework or combinations of frameworks.

The designer module 102 may interface and communicate with the repository 104, which also may be referred to interchangeably as the metadata repository 104. The designer module 102 is configured to read data from the metadata repository 104 and is configured to write data to the metadata repository 104. The metadata repository 104 may include a repository that is configured to store the all of the UI entities in a central repository. In one exemplary implementation, the UI metadata may include configuration files, which may be source-based configuration files using an extensible markup language (XML) format. In one exemplary implementation, the metadata repository 104 may reside on a server and the designer module 102 may access and interface with the metadata repository 104 on the server using a communications protocol over a communications network, including, but not limited to the Internet.

The designer UI 106 may be configured to browse the UI components stored in the repository 104. The listed UI components may include different types of UI components and the UI components may be selectable by a user for display in the designer UI 106. A selected UI component 110 loaded into the designer UI 106 and may be modified by a user having an appropriate role and/or rights. In addition to selecting and modifying an existing component stored in the metadata repository 104, a new UI component may be created using the designer UI 106 and the new UI component may be written to the metadata repository 104.

In one exemplary implementation, the UI component may be invoked at runtime on a client device running a client application (not shown), which also has access to the same metadata repository 104. The client application may include a client engine that is configured to interpret the configuration file at runtime and to render the UI component as a physical representation in the client application on a client device.

When the UI component 110 is loaded into the designer UI 106, the check engine UI 108 may be notified that the UI component 110 has been loaded. The check engine UI 108 may be configured to provide an interface for a developer to perform one or more checks on a selected UI component such as, for example, selected UI component 110. Additionally, the check engine UI 108 may be configured to provide an interface for a developer to perform one or more checks on components stored in the repository 104. In this manner, the developer can trigger the checks on the UI component from the check engine UI 108, the developer can view the check results in the check engine UI 108 and the developer can take one or more different types of actions related to the check results in the check engine UI 108.

The designer module 102 may include a check engine 112 and a buffer 114. The check engine 112 may be configured to perform one or more checks on one or more selected UI components and to generate check results. The check results may be stored in the buffer 114. The check engine 112 and the buffer 114 may be integrated components of the designer module 102. In the manner the check engine 112 and the check engine UI 108 are integrated components of the collaborative UI design environment, including direct access to the repository 104. Additionally, the check results may be stored as part of the UI component in the repository 104.

The check engine 112 may perform the checks based on a current context of the UI component in the designer UI 106. In this manner, the check engine 112 may be utilized to perform checks on the same UI component in different contexts. The check engine 112 may evaluating one or more rules using checks against the selected UI component. The check engine 112 provides the developer with a tool to report issues for supporting, tracking and planning purposes.

The check engine 112 may perform different types of checks on the UI component. The check engine 112 generates check results for each of the different types of checks, which are displayed in the check engine UI 108. For example, the check engine 112 may perform rule checks to identify issues related to UI inconsistencies. The check results may provide an explanation for any rule violation including detailed information and how to resolve the rule violation.

In response to the check results, a developer may set an exception and/or set an incident. An exception enables a developer to display the check result during subsequent checks as just a warning. The exception can be removed at any time. An incident enables a developer to bypass the identified check result. For instance, the developer may review the identified rule check violation and determine that the error may be with the rule check instead of the UI component and set an incident. The actions taken by the developer directly impact the model object on which the UI component is based.

A report of exceptions and/or incidents related to the UI component in different contexts may be generated. Additionally and/or alternatively, a report of exceptions and/or incidents related to multiple different UI components may be generated. These reports may be communicated to and used by test developers to modify the checks performed by the check engine 112.

The check engine 112 also may perform consistency checks to find any issues related to the UI component model. The consistency checks include checks to find errors that may prohibit the UI component from executing properly during runtime in client environment. For example, the consistency checks evaluate the constraints and the dependencies of the UI component. Similar to the actions available to the developer for the rules checks, the developer may set an exception and/or may set an incident.

The check engine 112 also may perform post-migration checks to identify any issues related to migrating an existing UI component from one architecture or development environment to a different architecture or development environment. In one implementation, UI components may be automatically migrated from a previous architecture or development environment to the repository 104. When the migrated UI component is loaded into the designer UI 106, the check engine 112 may perform one or more post-migration checks on the migrated UI component. The developer may take various action on any check results generated by the check engine 112 including setting an exception or setting an incident.

The check engine 112 may be configured to enable a developer to associate self-defined "To dos" with a UI component and/or with a specific issue identified by the check engine 112 for a UI component. The self-defined "To dos" may be annotations that are associated with the UI component, which may be saved along with the UI component in the repository 104 in XML format. In this manner, multiple developers can collaborate and work together on identified issues and provide annotations, which may be used by the other developers to correct the issues. The self-defined "To dos" may be removed or added using the check engine UI 108.

In one exemplary implementation, the check engine 112 may perform one or more checks on a selected UI component. The check engine 112 may generate the check results. The check engine 112 may perform self-correcting actions to correct the identified issues and then perform the checks again to determine if the actions taken corrected the issues. A listing of the check results and actions taken may be displayed for the developer in the check engine UI 108.

The buffer 114 may be used as a temporary memory location to store the check results generated by the check engine 112. The buffer 114 may be integrated as part of the check engine 112 and, thus, is integrated as part of the designer module 102.

FIG. 1 also illustrates a flow of an exemplary process using the check engine 112. For example, a UI component 110 may be retrieved from the repository 104 by the designer module 102 and loaded into the designer UI 106 (1). The check engine UI 108 may be notified about the UI component 110 (2). The UI component 110 may be loaded into the check engine 112 (3). A check of the UI component 110 may be performed or, if an action is triggered by the developer, then the action is handed over. The check or action is processed on the UI component (4) and the check results or modifications through actions are stored in the buffer 114 for each UI component (5). The list of check results is returned by the check engine 112 to the check engine UI 108 (6). The check engine UI 108 is updated and the check results are displayed.

The check engine 112 may be used to continue to perform checks and take actions on the UI component (4), store the check results and action modifications in the buffer (5) and display the check results in the check engine UI 108 (6) over multiple iterations without saving the action modifications and causing a save to the UI component, which has the effect of change the model object for the UI component. In this manner, the UI component may be worked on and checked by the developer without invoking the time and resources intensive process of changing the model object each time an action is taken on the UI component.

When the UI component is to be saved, the current state of the UI component 110 is loaded to the check engine UI 108 (7). The current state of the UI component 110 is also loaded in the check engine 112 (8). The check engine 112 fetches all of the check results and action modifications stored in the buffer 114 (9). The check engine 112 merges the current state of the UI component 110 with the check results and/or the action modifications (10). The merged component is returned to the check engine UI 108 and forwarded to the designer UI 106 (11). A reload of the merged component is triggered in the designer UI 106. The merged component is transferred and stored in the repository 104 (12). The check results and actions associated with the merged component also are transferred and stored in the repository 104.

Figure 2:
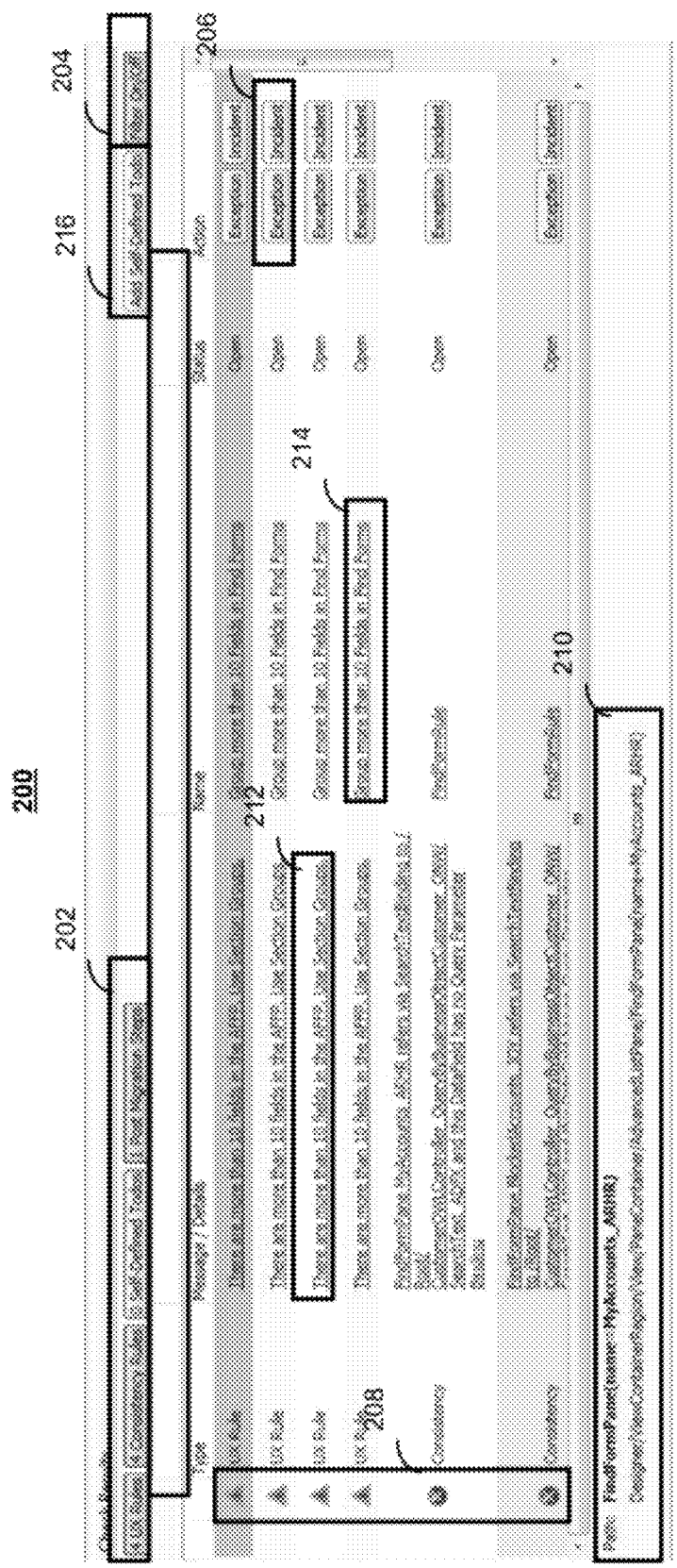
FIG. 2 is an exemplary screen shot of a design time application illustrating a check engine UI.

Referring to FIG. 2, a screen shot 200 of an exemplary check engine UI is illustrated. The check engine UI may include a type filter tab 202. The type filter tab 202 enables the developer to hide or show each of the different types of check results including hiding or showing different combinations of the different types of check results. For example, the developer may select any one or combination of UX rules, consistency rules, self-defined Todos and Post Migration Steps. The number in each of the tabs provides a count of the type of check result available for and/or being displayed.

The check engine UI may include a text filter tab 204. The text filter tab 204 enables a text filter row to be shown or collapsed. A simple just-in-time text search is performed on the values of the particular column. Non-matching rows may be collapsed on text input and multiple different combinations are possible.

The check engine UI may include action buttons such as, for example, action buttons 206. The action buttons available may be based on the type of check result. For example, for a UX rule type issue, an exception button and an incident button are available. An action can be triggered when the UI component is editable and the action modification may be temporarily stored in the buffer 114 by the check engine 112 until a final save is done. Upon a final save, then the UI component is updated accordingly.

The check engine UI may include a category filter 208. Each type of check result includes different categories. By selecting one of the category filters 208, only the items of the selected category are shown. Selecting the same filter again results in all of the categories being shown.

The check engine UI may include an element path 210. When a row is highlighted, then the respective element and the complete path of the element are shown. The element path 210 may assist a user in identifying the element inside the XML object model of the UI component.

The check engine UI may include element selection links such as, for example, element selection link 212. Selecting the element selection link 212 causes the respective UI element to be highlighted in the designer UI 106.

The check engine UI may include wiki-description links such as, for example, wiki-description link 214. Selecting the wiki-description link 214 opens a detailed description of the selected issue and/or message.

The check engine UI may include an Add Self-Defined ToDo tab 216. This tab 216 enables the developer to add a component-wide self-defined To Do. For example, upon selection, the developer may enter text and define a priority for each self-defined To Do. It also may be possible to define a self-defined To Do on a selected UI element using an option in the context menu. As discussed above the self-defined To Dos are stored in the repository 104 along with the UI component.

In one exemplary implementation, the categories and priorities of self-defined To Dos may include an error category with a high priority, a warning category with a medium priority and an information category with a low priority. The categories and priorities may include different indications and means for indicating the level of category and priority.

FIG. 3 is a block diagram of an example model-view-controller structure 300. Model-view-controller (MVC) is an architectural pattern used in software engineering. In an MVC context, a model 302 may represent information or data of an application. A view 304 may correspond to elements of a user interface such as text, buttons, checkbox items, etc. A controller 306 manages the communication of data and the rules used to manipulate the data to and from the model. FIG. 3 shows the dependencies among the model 302, view 304, and the controller 306.

FIGS. 4a-4b are block diagrams illustrating an example component structure. According to an example embodiment, a UI component 402 may include a self contained model of a UI that may be declaratively used in another UI model. A declarative interface 400a of a UI component 402 may include in-ports 404 and out-ports 406. These ports may be used to implement a loosely coupled behavior in embedding or navigation scenarios. The data of a loosely coupled component may be loaded asynchronous (i.e., an additional roundtrip between the frontend and backend may be needed). The declarative interface 402 may also include binding 408, for tightly coupled behavior in embed scenarios (e.g., synchronous loading), working directly on the data model of a parent UI model (e.g., via references to the parent data model). The declarative interface 400a may also include configuration 410. A technical configuration may be exposed, e.g., to enable a user to support different styles/flavors, e.g., statically set at design time.

As shown in a logical component model 400b of FIG. 4b, a component 402 may be a control 412 provided by a system framework or implemented in association with framework controls (e.g., a Silverlight control 414). A component 402 may be a composite 416 (e.g., composite control, building block, etc.) which may include other components (e.g., nested composites and/or controls). Components 402 may expose an interface or interfaces for actions, ports and bindings. A composite may be used and configured in a view-composition or used as the target of a navigation as a standalone UI application. The configuration of a non-framework component may be generated via the exposed declared interface.

Figure 5:
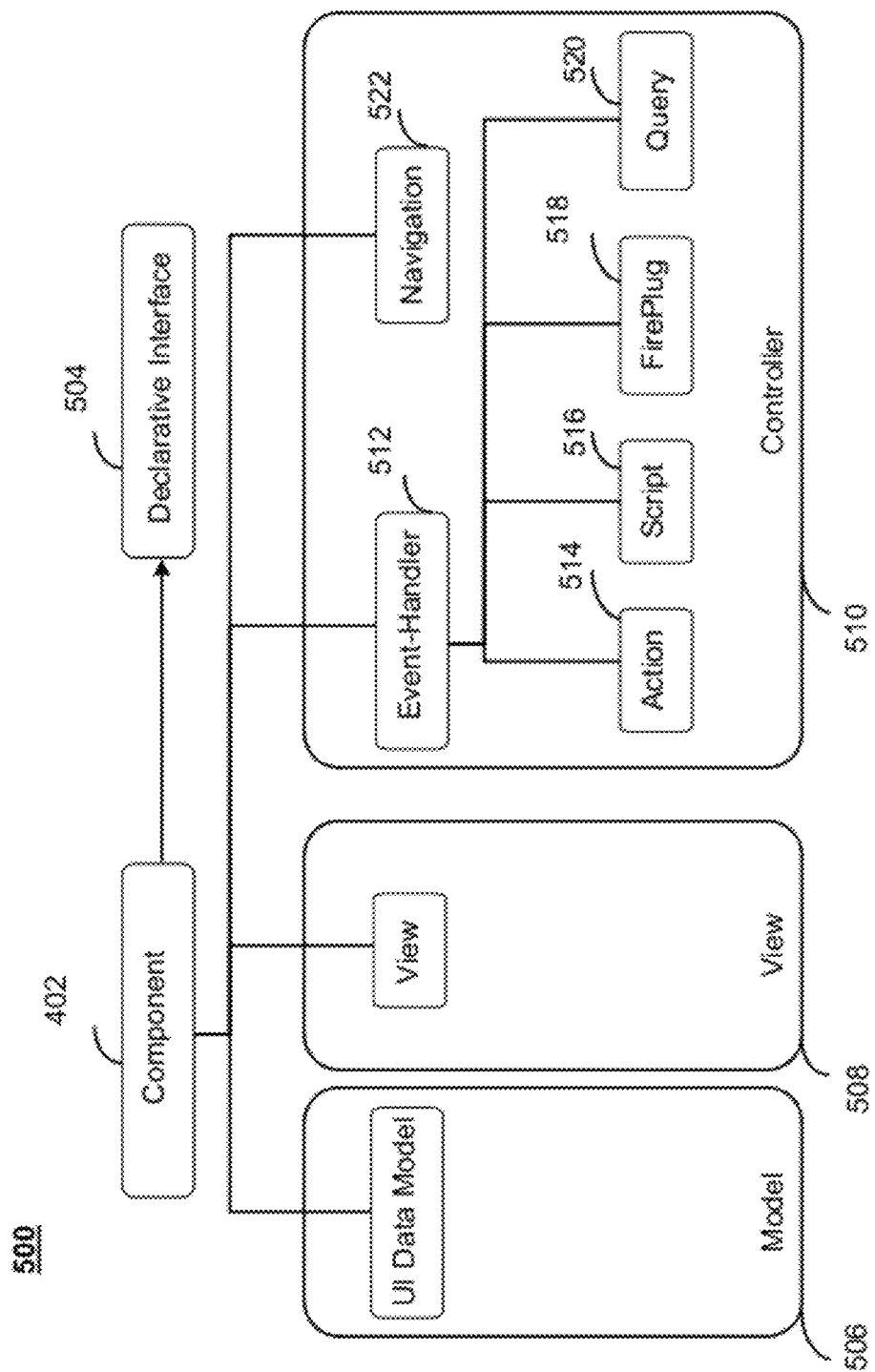
FIG. 5 is a block diagram of an example declarative interface structure for components.

FIG. 5 is a block diagram of an example declarative interface structure 500 for components. A component 402 may include a declarative interface 504, a model 506, a view 508, and a controller 510. For example, a view 508 may include a description of the user interface which binds to a UI data model 506 and triggers event-handlers 512. The UI data model 506 may describe data structure, which can bind to backend data. The controller 510 may recognize various types of event-handlers 512 such as business object actions 514, script 516, plug-operations 518 and queries 520. According to an example embodiment, navigation 522 may include a context-mapping for outplug-inplug-operations. The declarative interface 504 may expose ports, binding-capabilities and configuration to the composition environment.

Figure 6:
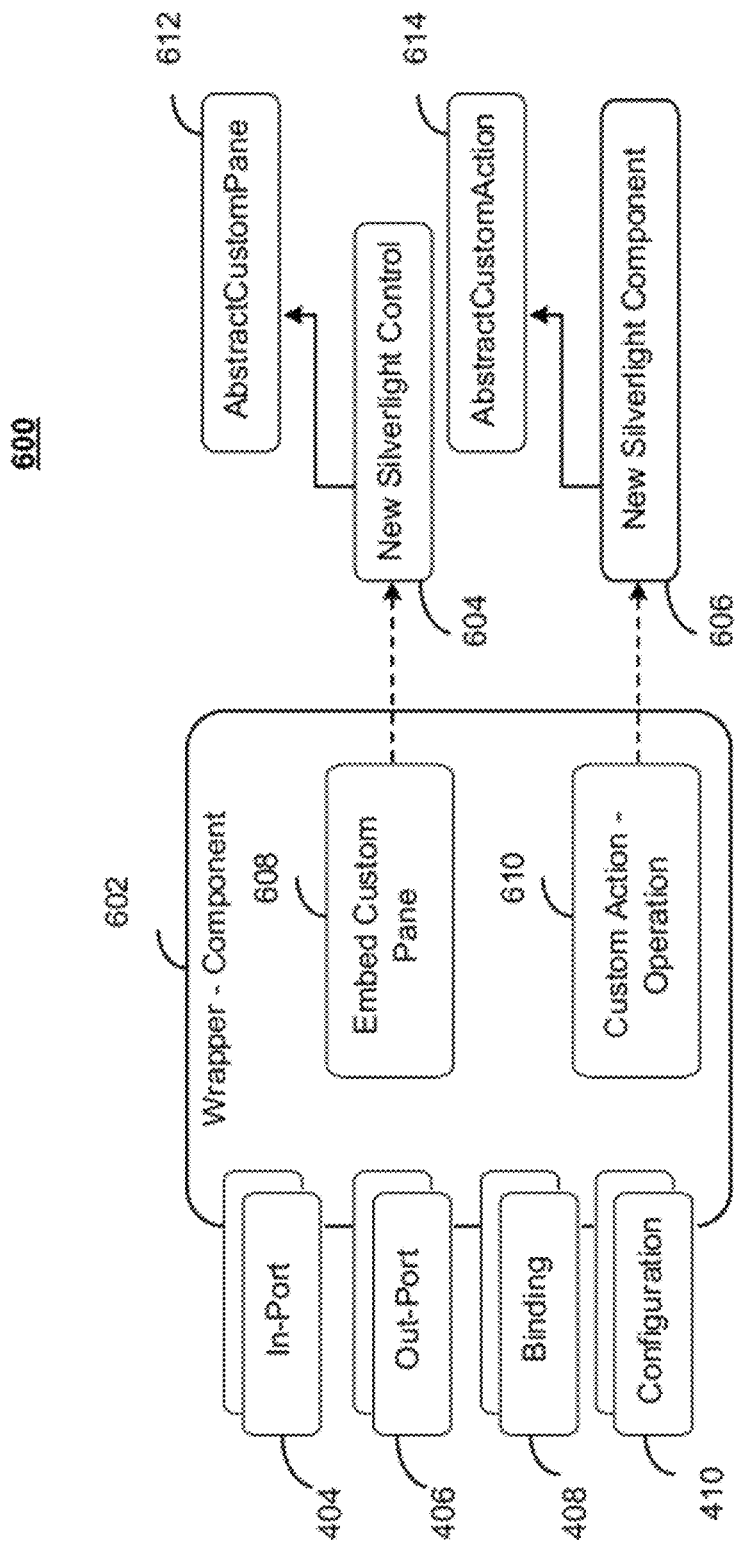
FIG. 6 is a block diagram of an example structure for a component wrapper.

FIG. 6 is a block diagram of an example structure 600 for a component wrapper 602. According to an example embodiment, native Silverlight components may be generated (e.g., Silverlight control 604, Silverlight component 606) which can interact with the component data model and may participate in events. A developer may implement interfaces and use these components via a custom pane 608 in an EmbedComponent-Type, and via a custom action operation 610, respectively. Through this a declared interface wrapper may use these components in other components. Custom panes may be utilized via EmbedComponents and may be associated with a control derived from AbstractCustomPane 616 for controls or from Abstract CustomAction 614 for action components. According to an example implementation, custom panes that are configured in EmbedComponents may point to an assembly name and class type name of a control derived from the framework AbstractCustomPane. Embedcomponents may be used in other components, as this provides a capability at designtime to reflect on the declarative interface of the wrapper component.

Figure 7:
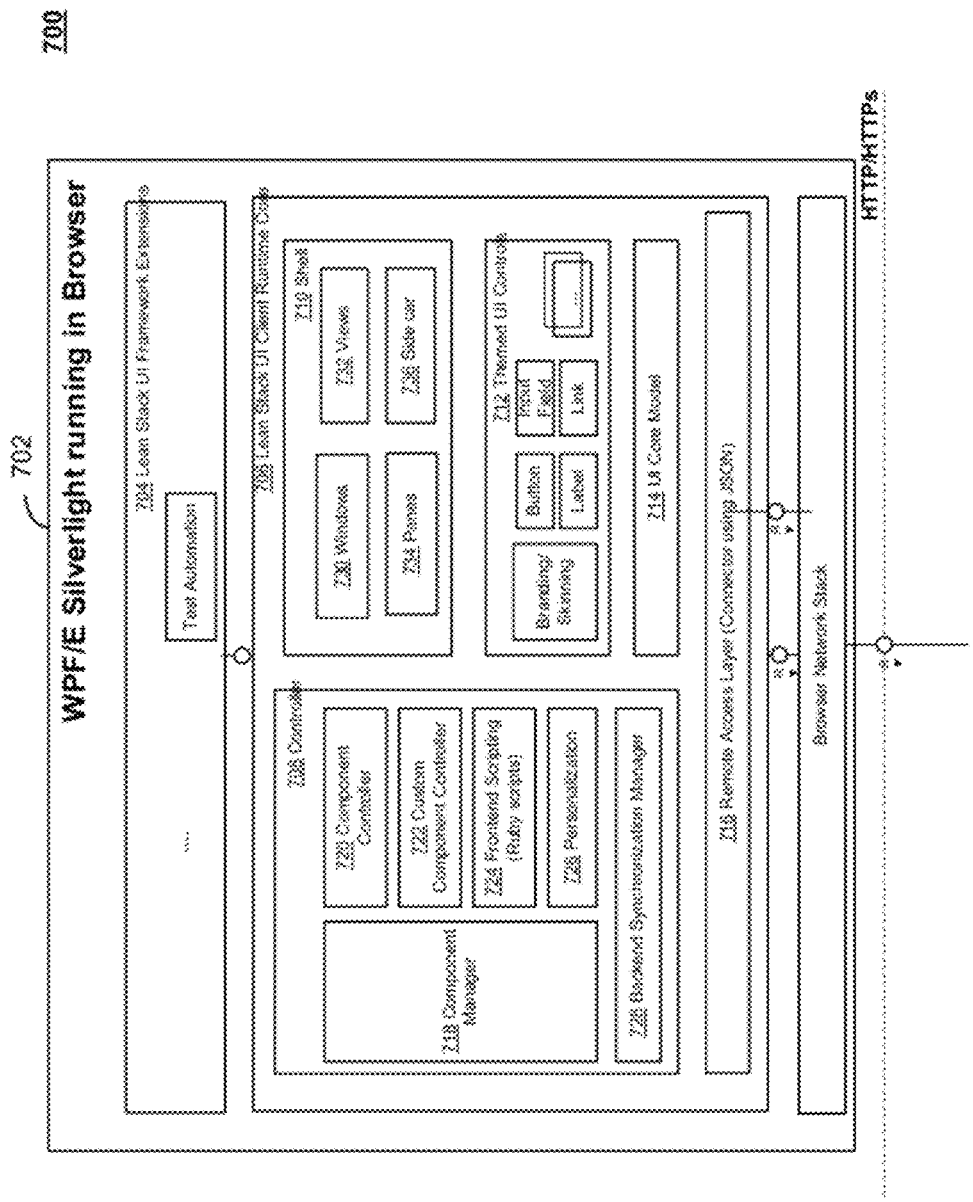
FIG. 7 is a block diagram of an example runtime client.

FIG. 7 is a block diagram of an example runtime client 700. As shown in FIG. 7, Silverlight 702 is running in the client program (e.g., a browser). The system includes lean stack UI framework extensions 704. The system further includes a lean stack UI client runtime core 706, which includes a controller 708, a shell 710, themed UI controls 712, a UI core model 714, and a remote access layer 716. The controller 708 includes a component manager 718 for managing components, which were discussed previously. The controller 708 also includes a component controller 720, a custom component controller 722, a frontend scripting engine 724, a personalization engine 726, and a backend synchronization manager 728. The shell 710 includes windows 730, views 732, panes 734, and side cars 736.

User requests may be triggered on the client side during UI runtime. The first user request may be a navigation request that results in a request to the backend to read a UI component. The UI component is read from a central metadata repository in the backend and transported to the frontend. The component manager 718 may instantiate the UI component and a corresponding component controller 720 for the UI component on the client side and triggers the initialization of the UI component on the backend side. The component manager 718 generates a control tree for the UI component out of the controls provided in a central "Themed Controls" 712 package. These controls ensure uniform look and feel and the ability to change themes consistently. The controls in the "themed UI controls" package may be enabled in a consistent way for test automation and accessibility, and may be provided in a manner such that all native implemented custom UI panes may use the controls. More than one UI component may be needed to render a UI, as UI components may embed other UI components (e.g., a Work Center component may embed a Work Center View Component and they again may embed OWL components, etc.). The top-level UI component that is rendered is a root UI component which renders a common frame for all UI components, e.g., by rendering the top level navigation and has an ability to open a side car for personalization and help.

For each UI component the "generic" component controller 720 for that particular component is instantiated. If a custom UI pane is to be rendered then a corresponding custom component controller 722 may be instantiated. The component controller 720 ensures that all controls are bound to the proper fields of the UI model and executes all operations that are configured in the event handlers of the UI component. If, some script segments are discovered in the event handlers, the controller triggers the execution of these scripts in the frontend scripting engine 724. The component controller 720 may also trigger a roundtrip to the backend device. In that case the backend synchronization manager 728 identifies all changed data in the UI data model in the client and packs only the changed data in a request to the backend. After the backend controller computes the data in the backend all changed data and only the changed data from the backend (including all data changed via side effects) may be transported back to the frontend.

Figure 8:
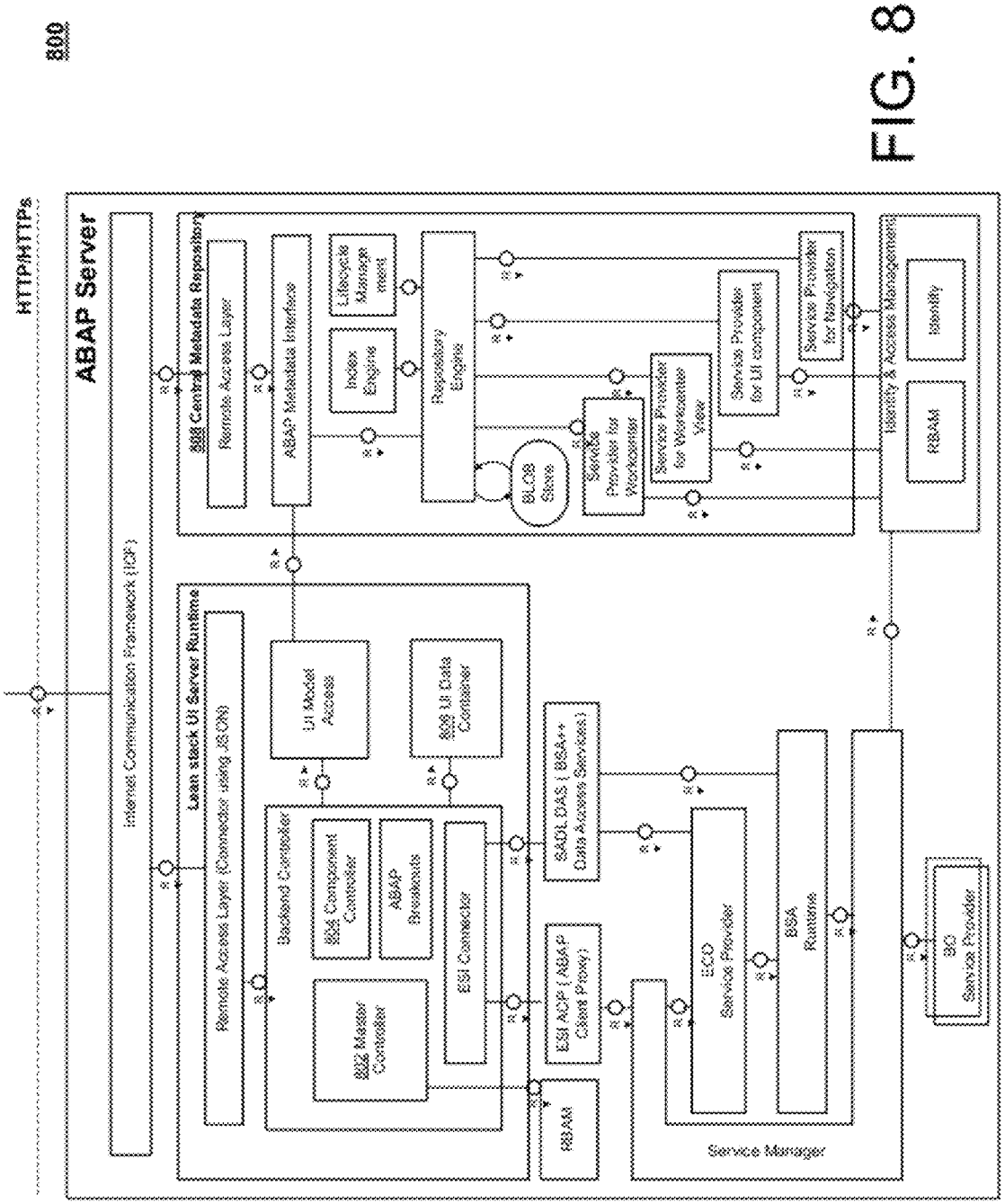
FIG. 8 is a block diagram of an example runtime backend device.

FIG. 8 is a block diagram of an example runtime backend device 800. After the client runtime 700 (as discussed above) triggers the initialization of a UI component in the backend for a first time in a session, the UI server runtime 800 may first create a master controller 802 for the complete session and then may generate a component controller 804 for each component that is requested from the client runtime 700. Each component controller 804 may build a UI data container 806 from the information of the UI model for a component. The master controller 802 may handle the choreography of the different controllers and may build a bracket for all operations targeted for one controller. The master controller 802 may also trigger another runtime and provide the other runtime with all relevant metadata. Relevant information is stored within the models of the UI components.

After the master controller 802 has processed all component controllers 804, it collects all the data that has changed in the UI data container 806 and transports all changed data to the client.

As discussed previously, the UI components may be stored in a central metadata repository 808 on the backend device.

According to an example embodiment, communications between components may be modeled via semantic navigation targets. In this instance, target components are not named directly, but navigation may be invoked based on a host business object and an operation. An operation may be a standard-operation (e.g., display, edit, list, etc.) or a custom operation introduced in a navigation registry. The in- and out-ports of a UI component may be used in the definition of a navigation to identify the involved UI components for the runtime.

A navigation provider may thus replace dynamically at component load/generation time the semantic navigation targets by UI components. This concept allows flexibility regarding determination of navigation targets according to use cases. The semantics of a business object and an operation (e.g., SalesOrder—Open) may be used as a navigation query for requesting a navigation target. Each application UI to be used as a navigation target defines a business object and an operation name as navigation target descriptor to indicate which navigation requests it supports.

To support some special use cases (e.g., globalization, verticalization) a third parameter beside business object and operation may be made available which has no fixed semantic but can be defined by the applications (e.g., in some cases this third parameter is the country for which a special UI component has to be launched).

Implementations of the various techniques described herein may be implemented in digital electronic circuitry, or in computer hardware, firmware, software, or in combinations of them. Implementations may be implemented as a computer program product, i.e., a computer program tangibly embodied in a non-transitory machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method including executing instructions recorded on a non-transitory computer-readable storage media using at least one processor, the method comprising:
   loading a component from a repository in a first user interface;
   notifying a second user interface that the component is loaded in the first user interface;
   performing one or more checks on the component using a check engine and generating one or more check results, wherein the one or more checks include one or more of rule checks, consistency checks and post-migration checks and the check results include results for each different type of check performed on the component;
   storing the check results in a buffer;
   displaying the check results in the second user interface, wherein the first user interface, the second user interface, the buffer and the check engine are integrated modules of a single application; and
   responsive to displaying the check results, enabling action on the check results by a user.

2. The method of claim 1 wherein performing one or more checks on the component comprises performing the one or more checks on the component based on a context of the component in the first user interface.

3. The method of claim 1 further comprising:
   merging a current state of the component loaded in the first user interface with the check results stored in the buffer to form a merged component; and
   loading the merged component in the first user interface.

4. The method of claim 3 further comprising storing the merged component in the repository.

5. The method of claim 3 further comprising storing the merged component and the check results in the repository.

6. The method of claim 1 further comprising:
   responsive to enabling the action on the check results by the user, enabling the user to edit the component in the first user interface;
   performing one or more checks on the component using the check engine and generating one or more check results;
   storing the check results in the buffer;
   merging the component with the check results; and
   loading the merged component in the first user interface.

7. The method of claim 1 further comprising:
   enabling the user to annotate the check results; and
   storing the merged component and the annotated check results in the repository.

8. A non-transitory recordable storage medium having recorded and stored thereon instructions that, when executed, perform the actions of:
   loading a component from a repository in a first user interface;

notifying a second user interface that the component is loaded in the first user interface;

performing one or more checks on the component using a check engine and generating one or more check results, wherein the one or more checks include one or more of rule checks, consistency checks and post-migration checks and the check results include results for each different type of check performed on the component;

storing the check results in a buffer;

displaying the check results in the second user interface, wherein the first user interface, the second user interface, the buffer and the check engine are integrated modules of a single application; and responsive to displaying the check results, enabling action on the check results by a user.

9. The non-transitory recordable storage medium of claim 8 wherein the instructions that, when executed, perform the action of performing one or more checks on the component comprises instructions that, when executed, perform the action of performing the one or more checks on the component based on a context of the component in the first user interface.

10. The non-transitory recordable storage medium of claim 8 further comprising instructions that, when executed, perform the actions of:

merging a current state of the component loaded in the first user interface with the check results stored in the buffer to form a merged component; and loading the merged component in the first user interface.

11. The non-transitory recordable storage medium of claim 10 further comprising instructions that, when executed, perform the action of storing the merged component in the repository.

12. The non-transitory recordable storage medium of claim 10 further comprising instructions that, when executed, perform the action of storing the merged component and the check results in the repository.

13. The non-transitory recordable storage medium of claim 8 further comprising instructions that, when executed, perform the actions of:

responsive to enabling the action on the check results by the user, enabling the user to edit the component in the first user interface;

performing one or more checks on the component using the check engine and generating one or more check results;

storing the check results in the buffer;

merging the component with the check results; and loading the merged component in the first user interface.

14. The non-transitory recordable storage medium of claim 8 further comprising instructions that, when executed, perform the actions of:

enabling the user to annotate the check results; and storing the merged component and the annotated check results in the repository.

15. A computer system including instructions stored on a non-transitory computer-readable storage medium, the computer system comprising:

a repository that is arranged and configured to store a plurality of components;

a designer module that is arranged and configured to:
load a component from the repository in a first user interface; and
notify a second user interface that the component is loaded in the first user interface; and a check engine that is arranged and configured to:
perform one or more checks on the component, wherein the one or more checks include one or more of rule checks, consistency checks and post-migration checks;
generate one or more check results, wherein the check results include results for each different type of check performed on the component;
store the check results in a buffer;
cause the check results to be displayed in the second user interface;
responsive to displaying the check results, enable action on the check results by a user,
wherein the check engine, the first user interface, and the second user interface are integrated modules of the designer module.

16. The computer system of claim 15 wherein the check engine is arranged and configured to perform the one or more checks on the component based on a context of the component in the first user interface.

17. The computer system of claim 15 wherein the check engine is further arranged and configured to:

merge a current state of the component loaded in the first user interface with the check results stored in the buffer to form a merged component; and load the merged component in the first user interface.

18. The computer system of claim 17 wherein the designer module is further arranged and configured to store the merged component and the check results in the repository.

19. The computer system of claim 15 wherein:

the designer module is arranged and configured to enable the user to edit the component in the first user interface in response to enabling the action on the check results by the user; and the check engine is further arranged and configured to:
perform one or more checks on the component,
generate one or more check results,
store the check results in the buffer, merge the component with the check results; and
load the merged component in the first user interface.

20. The computer system of claim 15 wherein:

the check engine is further arranged and configured to enable the user to annotate the check results; and the designer module is arranged and configured to store the merged component and the annotated check results in the repository.

* * * * *